March 22, 1960  S. BOARDMAN  2,929,474
BOLT RETAINER

Filed Aug. 26, 1958  2 Sheets-Sheet 1

INVENTOR.
STANLEY BOARDMAN
BY
ATTORNEYS

March 22, 1960 S. BOARDMAN 2,929,474
BOLT RETAINER

Filed Aug. 26, 1958 2 Sheets-Sheet 2

INVENTOR.
STANLEY BOARDMAN
BY
ATTORNEYS

United States Patent Office 2,929,474
Patented Mar. 22, 1960

2,929,474
BOLT RETAINER

Stanley Boardman, Ellicott City, Md., assignor, by mesne assignments, to the United States of America as represented by the Secretary of the Air Force Application August 26, 1958, Serial No. 757,433

2 Claims. (Cl. 189—36)

This invention relates generally to threaded fasteners and more particularly to a means for retaining a bolt in position to prevent loss or displacement during assembly or disassembly of a structure and to prevent the loosened bolts from interfering with the placement of the parts during assembly.

There are many instances where screw fasteners are used for detachably joining various parts of a structure. Ordinary screws and bolts have the disadvantage of becoming lost or misplaced during assembly and disassembly of the parts of the structure. Also, the screws or bolts are apt to become separated from the parts which they are used to join and, in certain cases, may fall into the mechanism of the structure and cause considerable damage or delay in recovering them.

In the attachment of various electronic control and tracking devices to missile assembles, it is absolutely essential that all the auxiliary equipment is firmly joined with the structure and that no odd screws or bolts fall into the missile itself and become a possible future source of trouble and failure. One way of preventing this is by the use of captive screws whereby the part to be attached and the attaching screws are held together so that even though the screw may be unscrewed from the structure and the part released, the screw does not separate from the part and, thus, cannot become lost or misplaced. There are various types of captive screw systems in which the screw is permanently associated with one of the parts to be joined and the corresponding nut member similarly associated with the other part. However, in many cases it is desirable to, not only retain the screw in the part, but also to retain it clear of the structure so as not to interfere with the assembly procedure of attaching the part to the structure.

Accordingly, an object of the invention is to provide a fastening device wherein the screw element may be retained in permanent association with one of the two parts to be detachably connected to each other, but can be easily removed if desired.

Another object of the invention is to provide a threaded member which has portions of its threads removed to the pitch diameter leaving a plurality of threaded sections remaining, said sections engaging with different nut members.

Still another object of the invention is to provide a bolt retainer assembly, including a threaded member of the character indicated, in which a bolt bearing block attached to one part is used to retain one of the nut members, the other nut member being permanently affixed to the structure to which the first named part is to be attached.

A further object of the invention is to provide a bolt retainer assembly which retains the bolt in such a manner that a clear and unobstructed attaching surface is mated with the main structure. This feature is particularly useful in the joining of a radar control unit to a missile structure where there is usually a minimum amount of clearance leaving barely enough room to slide the radar set into position for fastening. In this type of installation any protrusion on the part to be attached would add greatly to the time consumption as well as to the skill necessary for the fastening operation.

A still further object of the invention is to provide a means for retaining or captivating a bolt or screw within an enclosed area so that the threaded portion is protected from outside damage while alignment of the part is accomplished and before the bolt is engaged with its corresponding nut member.

These and many other objects, features and advantages of my invention, including the benefits derived from using many readily available component parts as well as the fact that no special tools are required in its utilization, will become more apparent from the following description taken in connection with the illustrative embodiment in the accompanying drawings wherein.

Figure 1:
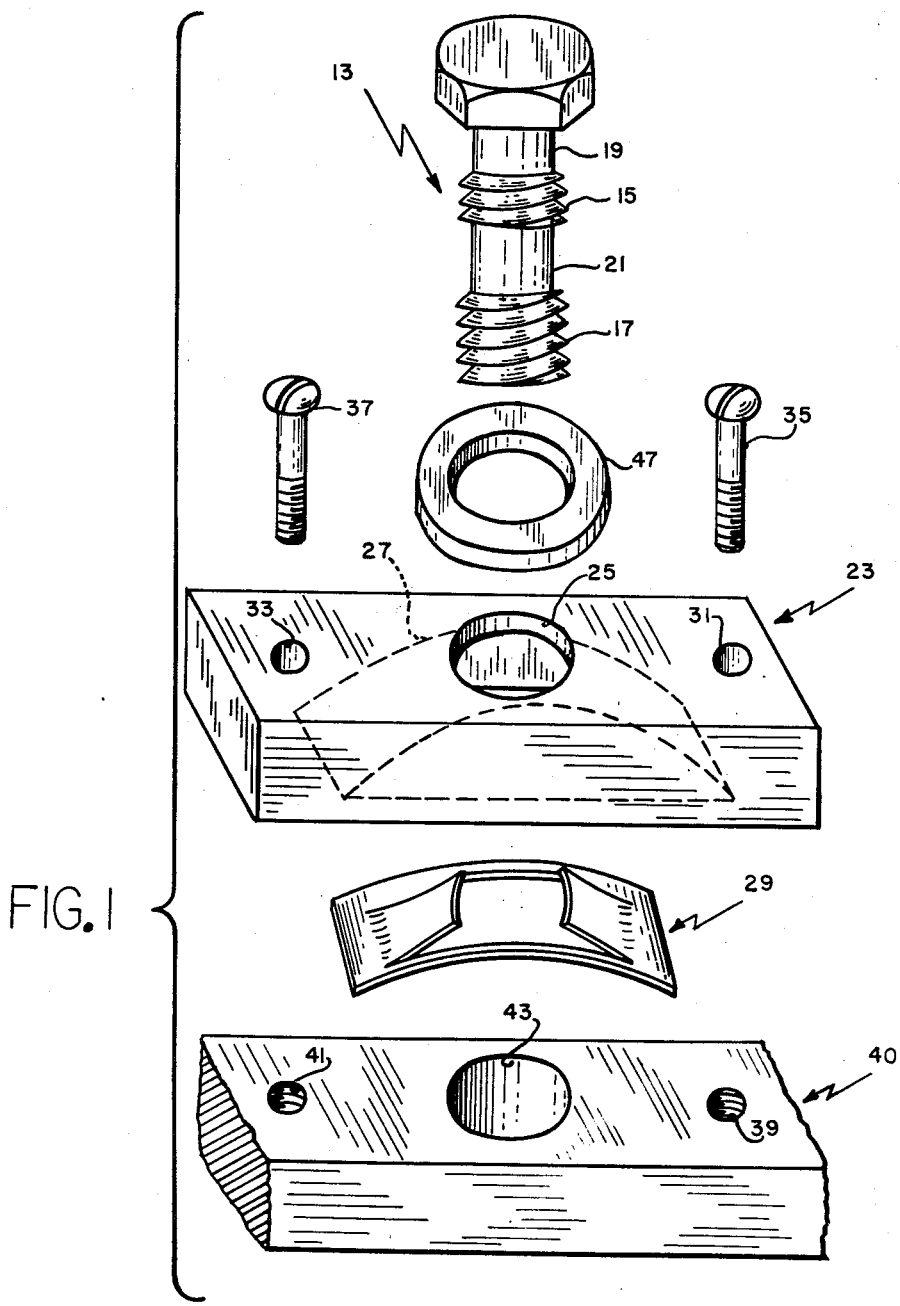
Fig. 1 is an exploded view of the bolt retainer assembly showing in perspective the bolt with its associated parts making up the captive screw system.

Referring now to Fig. 1, there is shown an exploded view of the captive screw assembly in perspective including the bolt member 13 having an upper threaded section 15 and a lower threaded end portion 17. The diameter of the remaining unthreaded portions 19 and 21 of the bolt member 13 is reduced to the pitch diameter of the threaded portions.

Associated with the bolt member 13 is a bolt bearing block 23 having a clearance hole 25 machined therein. A key slot 27, shaped like a Woodruff key and dimensioned to allow insertion of a speed nut 29 is located in the underside of the block 23. Sufficient clearance is allowed between the block 23 and the inserted speed nut 29 to permit movement in all planes so that the bolt 13 can be easily aligned therewith. Also included in the bolt bearing block 23 are clearance holes 31 and 33 for receiving the hold down screws 35 and 37 respectively.

The unit base 40 to which the captive screw assembly is attached has therein a pair of threaded holes 39 and 41 for receiving the hold down screws 35 and 37. A clearance hole 43 is positioned to allow the bolt 13 to pass therethrough and into its receiving nut member 45 (shown in Fig. 3).

Figure 2:
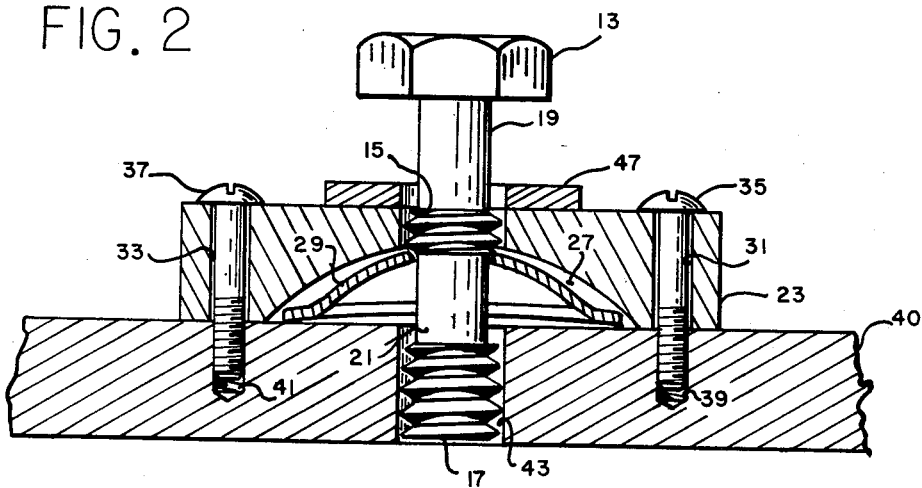
Fig. 2 is a sectional view of the assembly showing the bolt in the captivated position ready to be used to join two workpieces.

In Fig. 2 the assembly is shown attached to the base 40 and includes a thrust washer 47 placed on the top surface of the block 23. It can be clearly seen in this view that the speed nut 29 operates to hold the bolt 13 in a position such that the bottom surfaces of the base unit 40 is clear to slide into place when necessary because of the small clearance.

Figure 3:
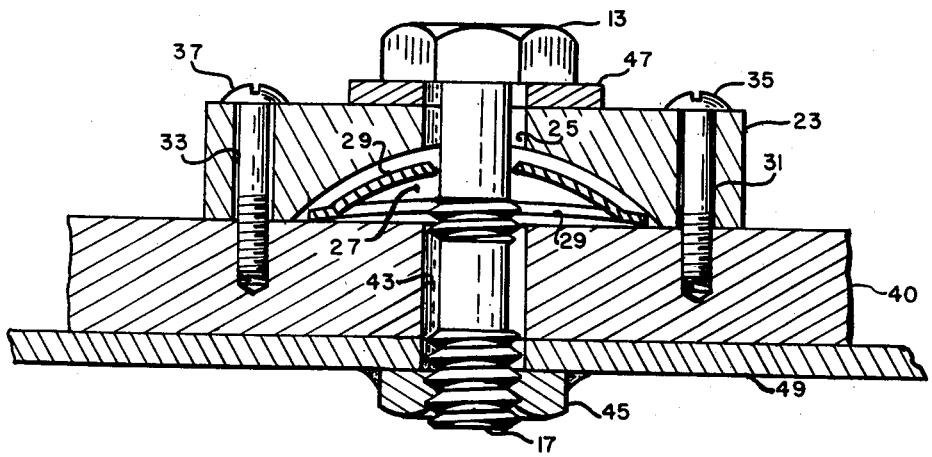
Fig. 3 is a sectional view of the assembly in its tightened down position showing the relative positions of the threaded sections and nut members.

After the assembly is placed over the proper position, the bolt 13 is screwed down into the nut member 45 as shown in Fig. 3. The nut 45 may be welded or clipped or held in any convenient manner to the structure 49 to which the unit is to be attached.

From the foregoing it will be apparent that the present invention contemplates a relatively simple yet efficient captive screw assembly which can be made from easily obtainable stock parts. The assembly is formed by inserting the speed nut 29 into the key slot 27 of the bolt bearing block 23, which is then fastened to the base member 40 by the screws 35 and 37. Then the bolt 13 with the washer 47 attached is placed into the opening 25 and turned until the lower threaded end 17 has passed through the speed nut 29. The unthreaded portion 31 then freely passes through the speed nut until the upper threaded section 15 comes in contact with the speed nut 29. This places the bolt in a position as shown in Fig. 2 where it can be seen that the speed nut 29 holds the bolt 13 from protruding below the outer surface of the base member 40 as well as preventing the bolt 13 from accidentally separating from the assembly.

The assembly, attached to the base member 40 may now be positioned in its proper location in relation to the structure 49. Further turning of the bolt 13 runs the upper threaded section 15 through the speed nut 29 and just as the last thread of section 15 passes through the speed nut 29 the first thread of portion 17 engages the nut member 45 as shown in Fig. 3. The possibility of threaded jamming is eliminated because only one set of threads is engaged at a time. The bolt 13 can then be tightened down in the conventional manner until its head is flush against the washer 47 and the unit base 40 is pulled down flush against the structure 49 making a solid, tight contact between the members which are attached together.

It will be understood that the description and drawings include only a single preferred embodiment of my invention and that various changes and modifications in the construction, proportion and arrangement of the components may be made without departing from the true spirit and scope of the invention.

Having thus described my invention what I claim as new and desire to secure by Letters Patent of the United States is:

1. A bolt retainer assembly comprising a first member and a second member to be detachably joined, a bolt element having a head and a plurality of threaded and unthreaded portions, the unthreaded portions being substantially equal to the pitch diameter of the threads, an apertured bearing block having a key slot therein, a resilient nut member disposed in said slot, the threads of said bolt element engaging with said resilient nut member, means for attaching said bearing block to the first of the detachably joined members, an internally threaded element attached to the second of said detachably joined members, said internally threaded element being positioned in axial alignment and engagement with said bolt element, and means for permanently retaining said bolt element in association with the first detachably joined member.

2. In combination with two detachably joined workpieces, a bolt having a head and a plurality of threaded and unthreaded portions, the unthreaded portions being equal to the pitch diameter of the threads, a first of said plurality of threaded portions being at the outer end of said bolt and a second threaded portion being disposed near the middle of said bolt, a first of said plurality of unthreaded portions being disposed between said first and second threaded portions and a second unthreaded portion being adjacent to the head, an apertured bearing block having an arcuate key slot formed in its underside, a thin metal apertured nut member disposed in said key slot, said nut member being held in said key slot from rotating relative to said bolt, means for attaching said bearing block to a first apertured workpiece said bolt being retained in and extending through said aperture of said bearing block and said nut member, an internally threaded member attached to a second workpiece, said internally threaded member being in axial alignment and engagement with the first threaded portion of said bolt, and means for retaining said bolt in permanent association with said first workpiece.

No references cited.